United States Patent
Gerding et al.

(10) Patent No.: US 7,544,038 B2
(45) Date of Patent: Jun. 9, 2009

(54) TRAY STACKING AND UNSTACKING CORNER GRIPPERS AND HANDLER

(75) Inventors: David Gerding, Barboursville, VA (US); Daniel Andrews, Charlottesville, VA (US)

(73) Assignee: National Optronics, Inc., Charlottesville, VA (US)

( * ) Notice: Subject to any disclaimer, the term of this patent is extended or adjusted under 35 U.S.C. 154(b) by 183 days.

(21) Appl. No.: 11/412,051

(22) Filed: Apr. 27, 2006

(65) Prior Publication Data
US 2007/0253803 A1 Nov. 1, 2007

(51) Int. Cl.
B65G 57/30 (2006.01)
B65G 1/00 (2006.01)

(52) U.S. Cl. .............. 414/794.9; 414/790.2; 414/795.3; 414/331.16; 221/297

(58) Field of Classification Search .............. 198/419.1, 198/347.1, 347.2, 347.3, 347.4; 221/290, 221/295, 297, 298, 299, 300, 301, 238; 414/788.8, 414/790.2, 795.2, 795.3, 331.04, 331.13, 414/331.14, 331.16, 788.2, 789, 789.1, 793.4, 414/793.6
See application file for complete search history.

(56) References Cited

U.S. PATENT DOCUMENTS

| | | | | |
|---|---|---|---|---|
| 2,904,941 A | * | 9/1959 | Midnight | 53/491 |
| 3,765,546 A | * | 10/1973 | Westerling | 414/795.2 |
| 4,018,031 A | * | 4/1977 | Smaw | 53/497 |
| 4,135,476 A | * | 1/1979 | Duryea | 118/259 |
| 5,101,546 A | * | 4/1992 | Otani et al. | 29/426.3 |
| 5,207,311 A | * | 5/1993 | Terai | 198/419.1 |
| 5,281,080 A | * | 1/1994 | Dale | 414/788.4 |
| 5,674,048 A | * | 10/1997 | Rich | 414/797.5 |
| 6,099,239 A | * | 8/2000 | Klipp | 414/797.4 |
| 6,283,703 B1 | * | 9/2001 | Dowling et al. | 414/788.7 |
| 6,647,616 B1 | * | 11/2003 | Matsumura et al. | 29/771 |
| 6,974,298 B2 | | 12/2005 | Tanaka | |
| 2002/0182051 A1 | * | 12/2002 | Lu et al. | 414/794.9 |

FOREIGN PATENT DOCUMENTS

EP 1 473 114 11/2004
EP 1 707 309 10/2006

\* cited by examiner

*Primary Examiner*—Gregory W Adams
(74) *Attorney, Agent, or Firm*—Berenato, White & Stavish, LLC

(57) ABSTRACT

The present invention is directed to a tray handler for stacking and de-stacking ophthalmic prescription trays. The tray handler includes a plurality of spaced clamp assemblies defining a stack area along a conveyor, a lift plate, and first and second actuators. The lift plate is operably disposed within the stack area. The first actuator is operably associated with the clamp assemblies, which are inwardly and outwardly moveable relative the lift plate upon actuation of the first actuator. The second actuator is operably associated with the lift plate, which is vertically moveable within the stack area upon actuation of the second actuator. A controller is in communication with the first and second actuators and controls actuation thereof. A method of handling ophthalmic prescription trays is also disclosed.

26 Claims, 13 Drawing Sheets

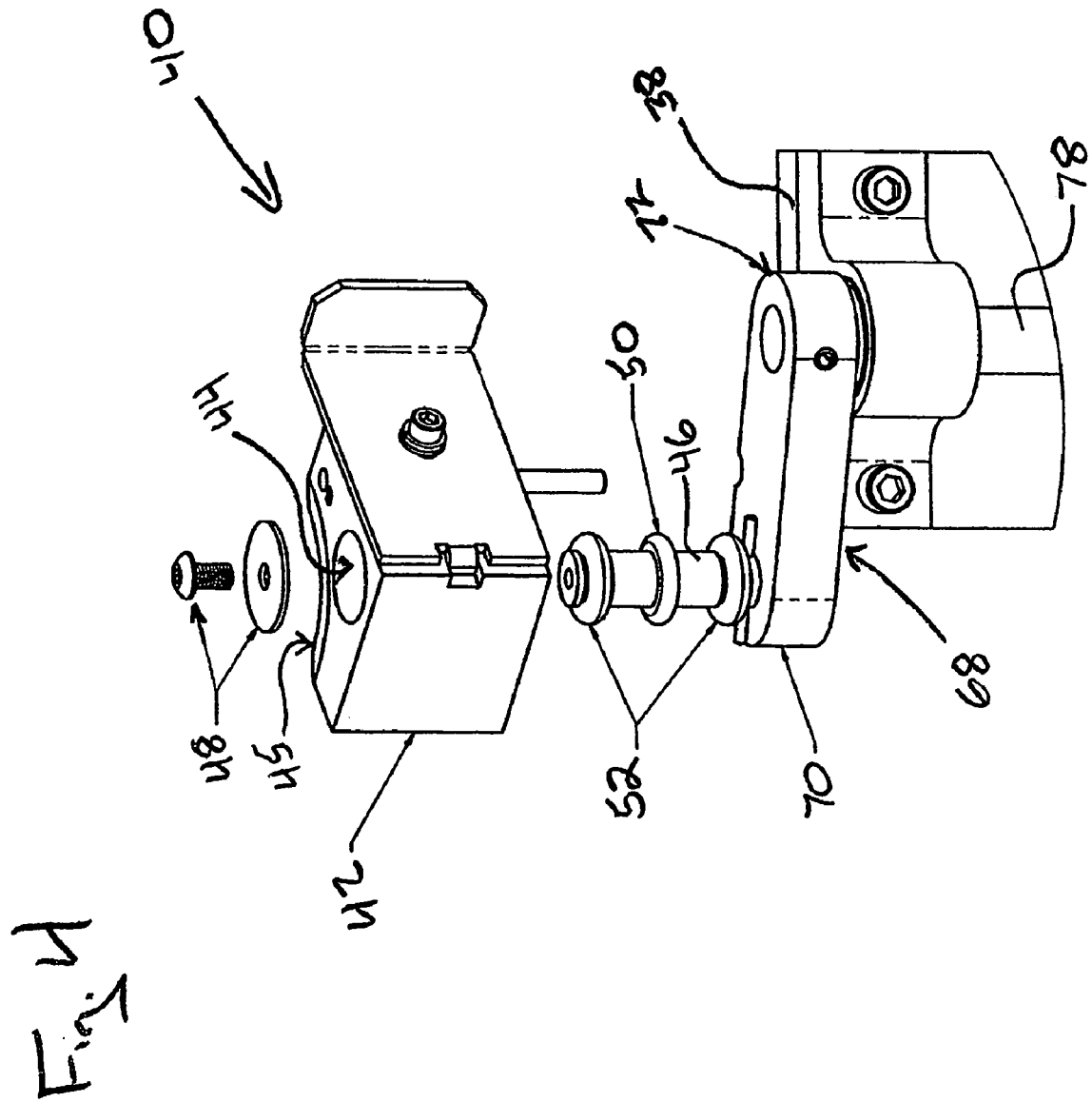

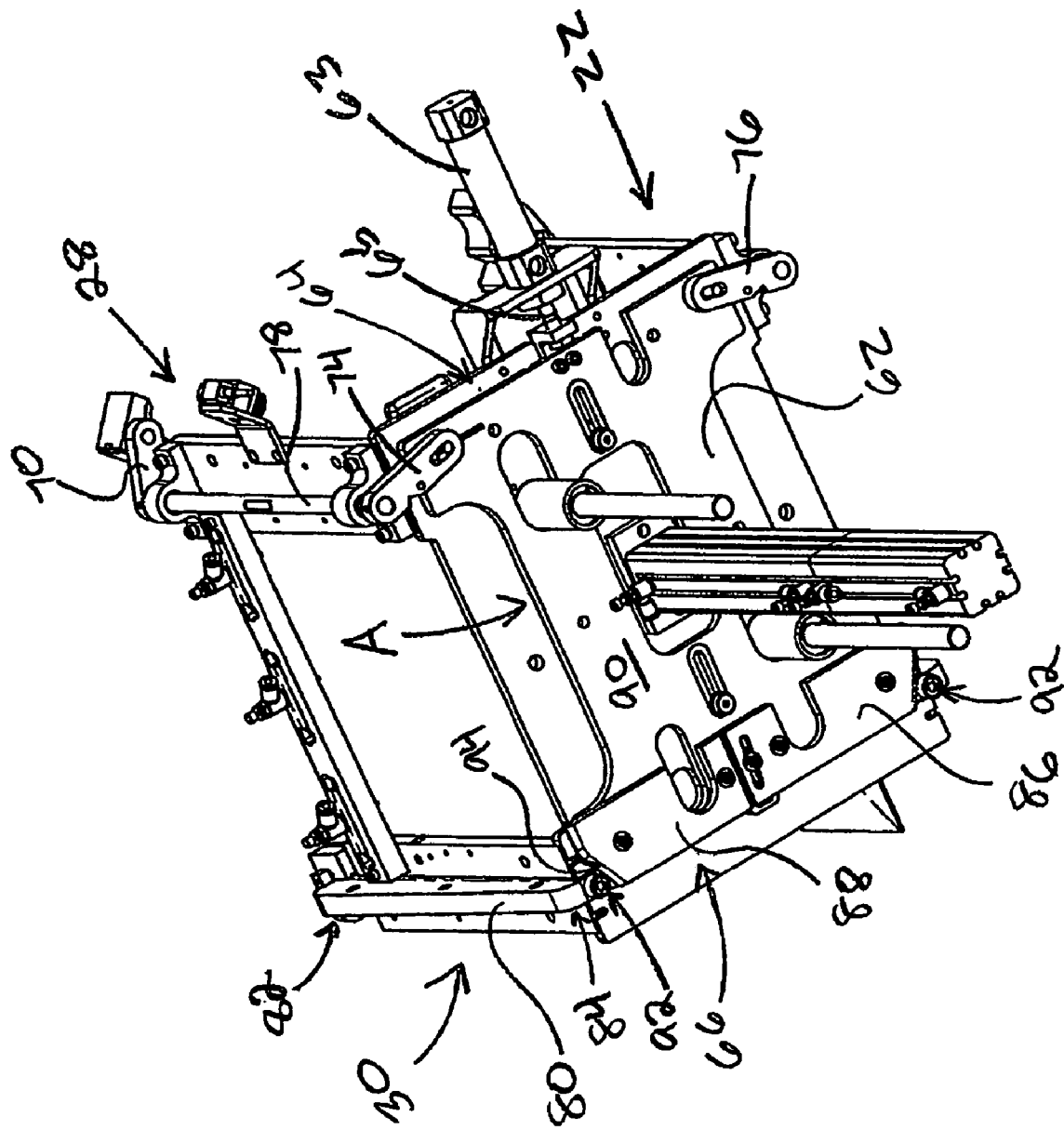

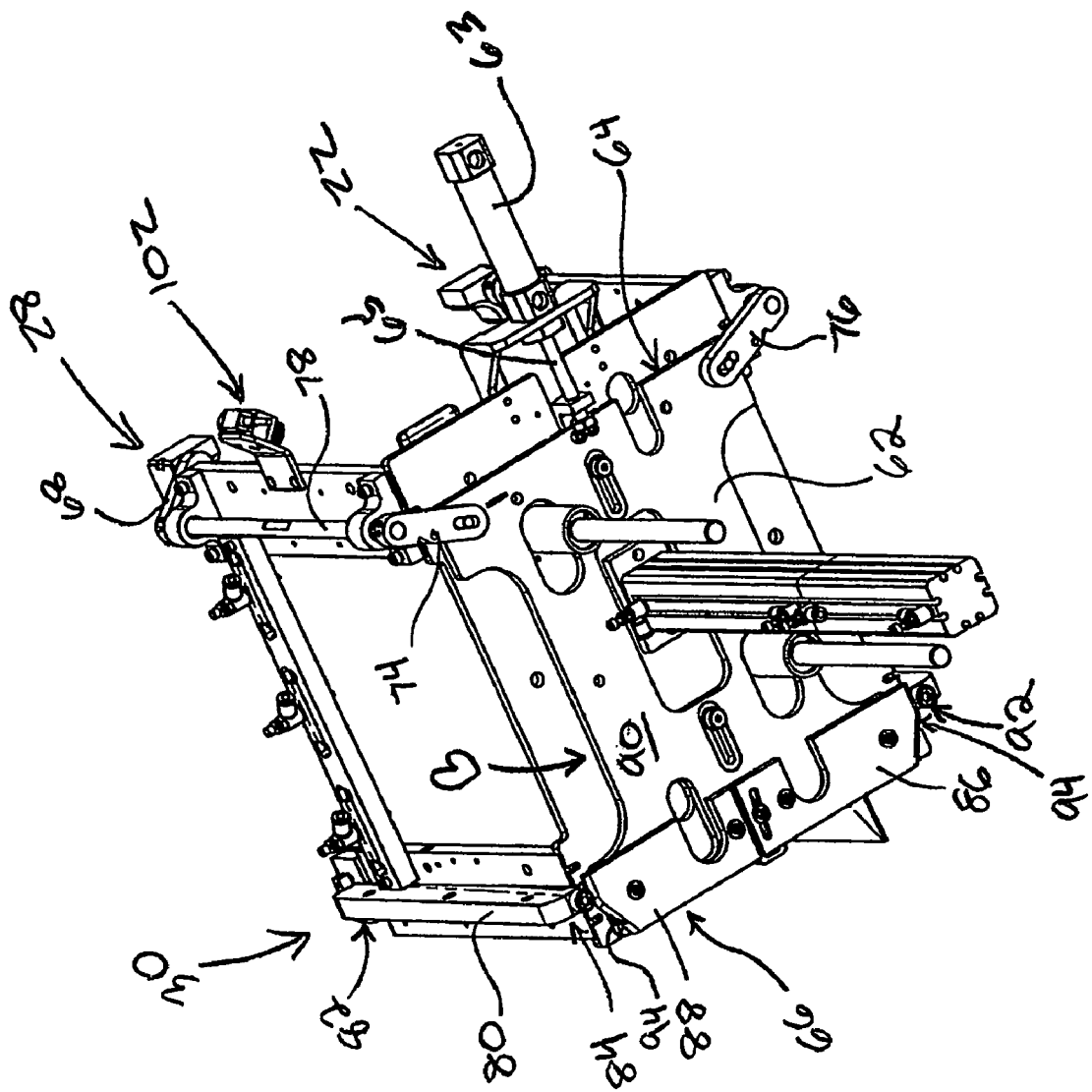

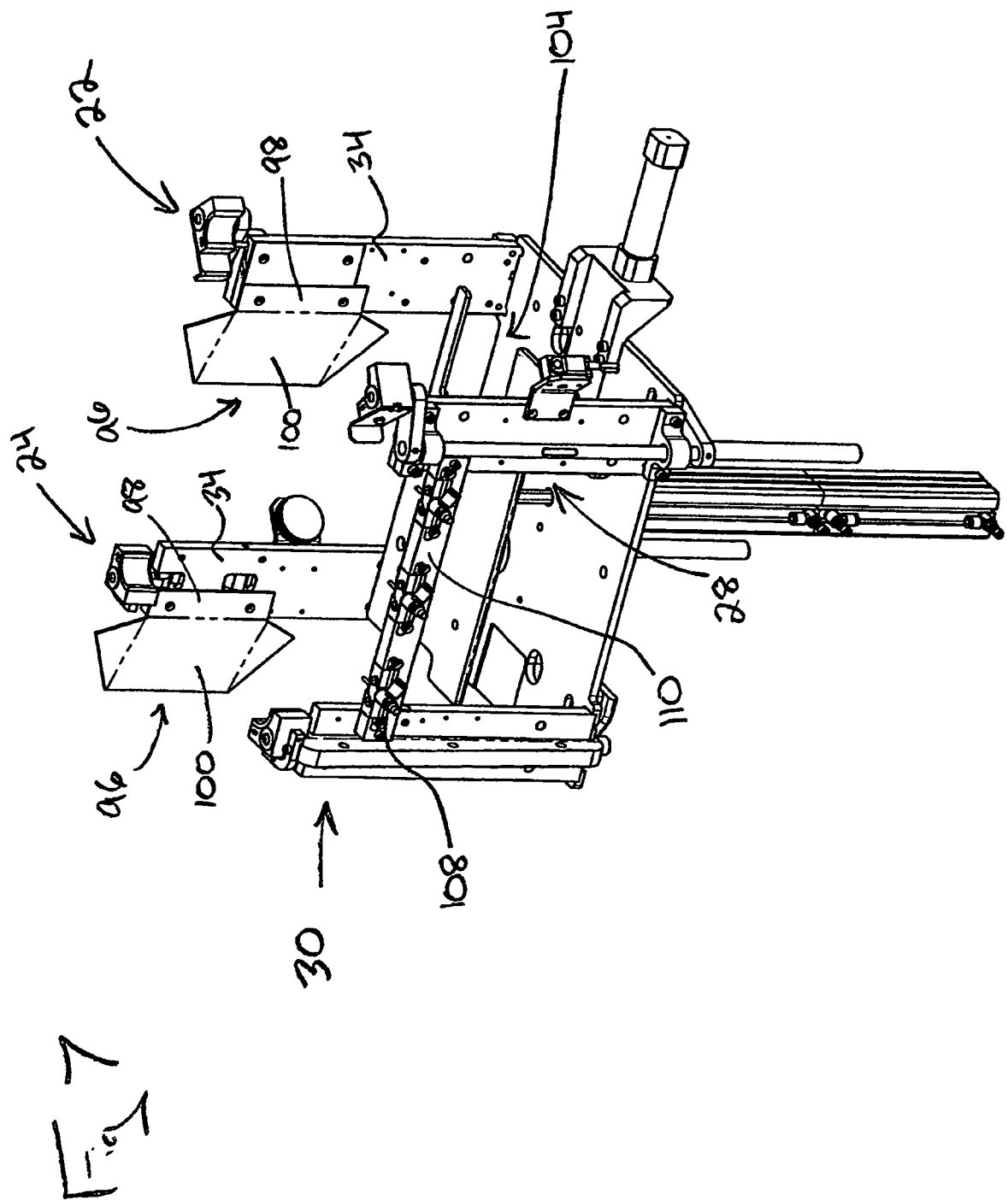

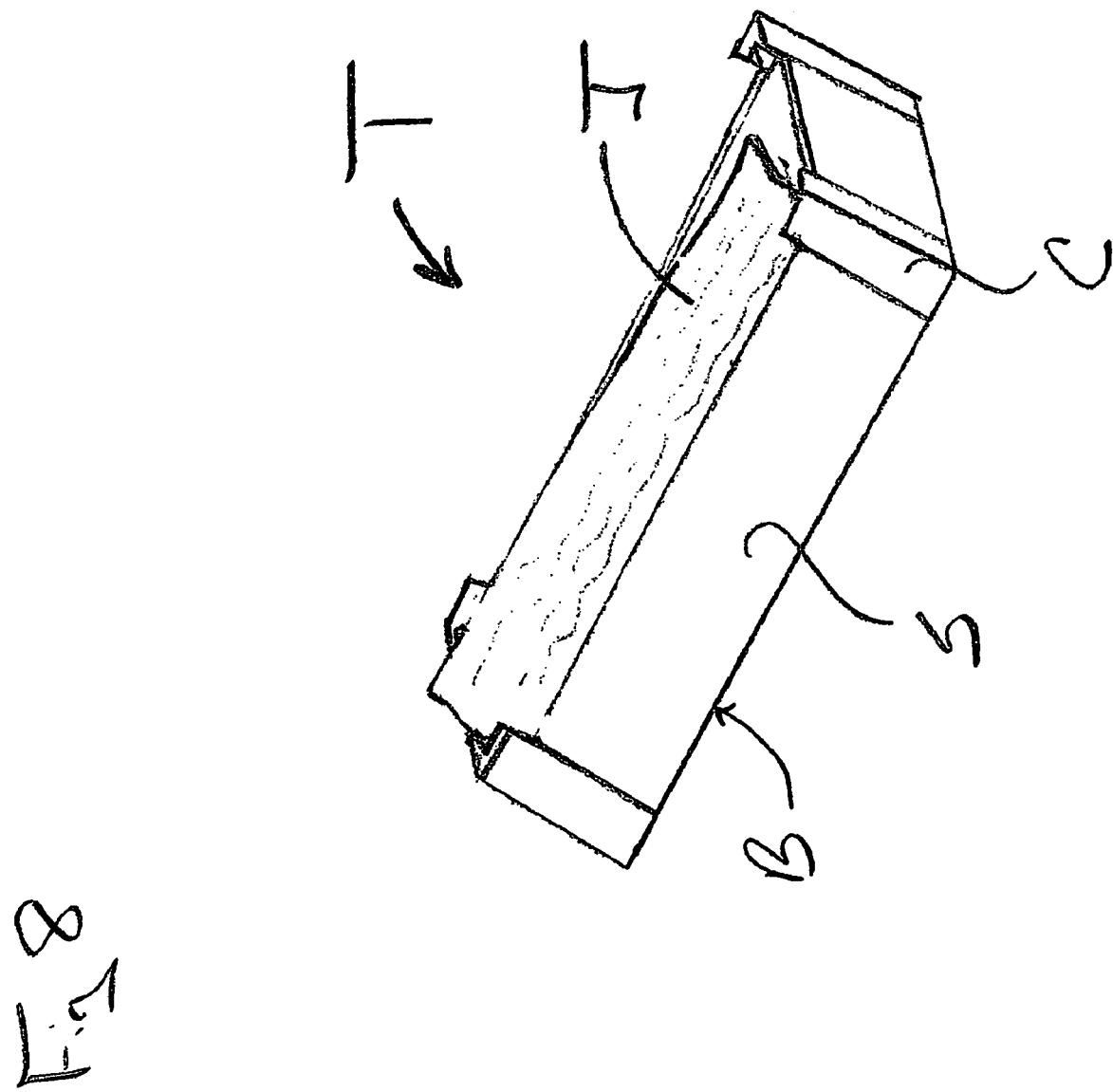

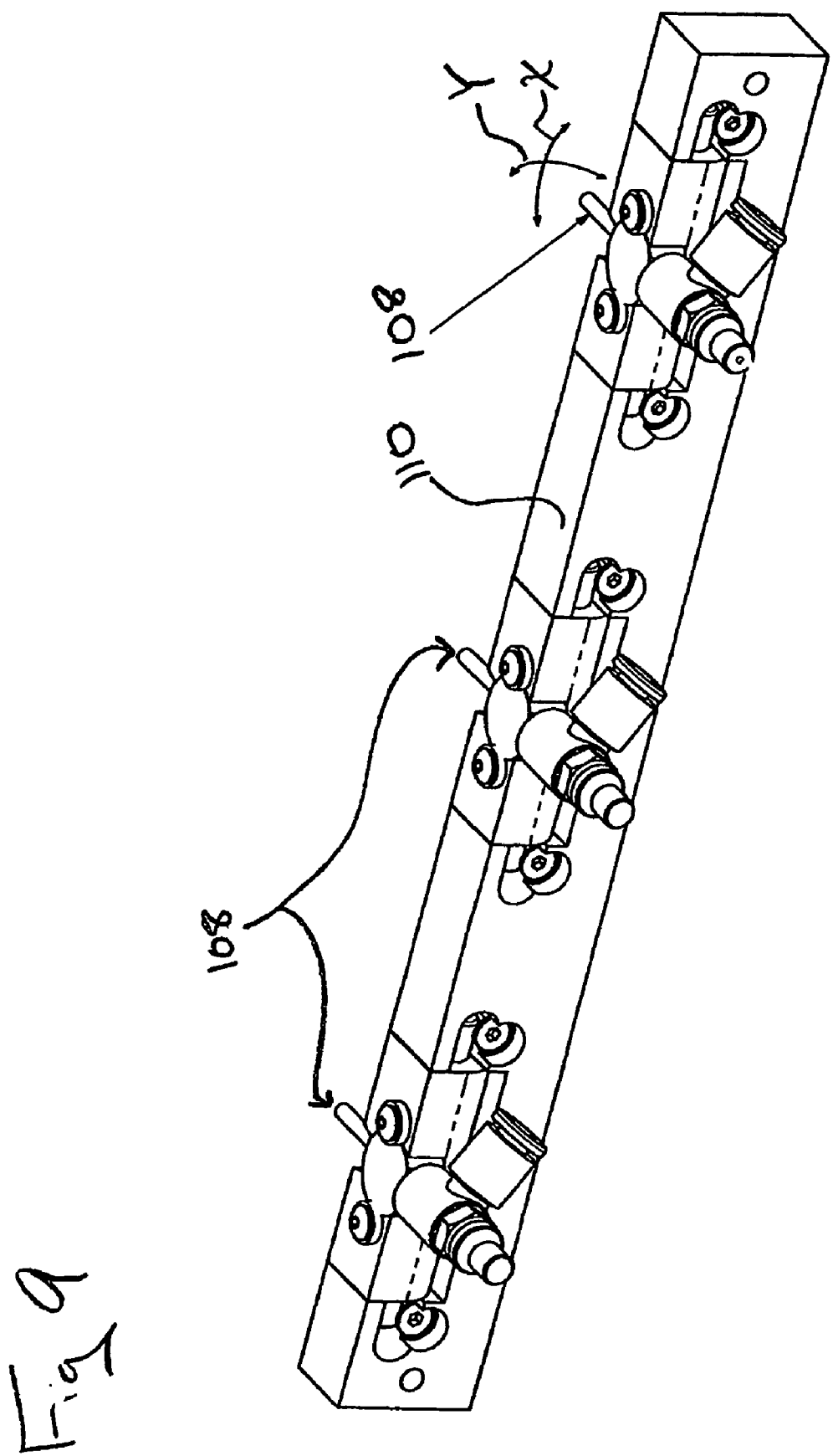

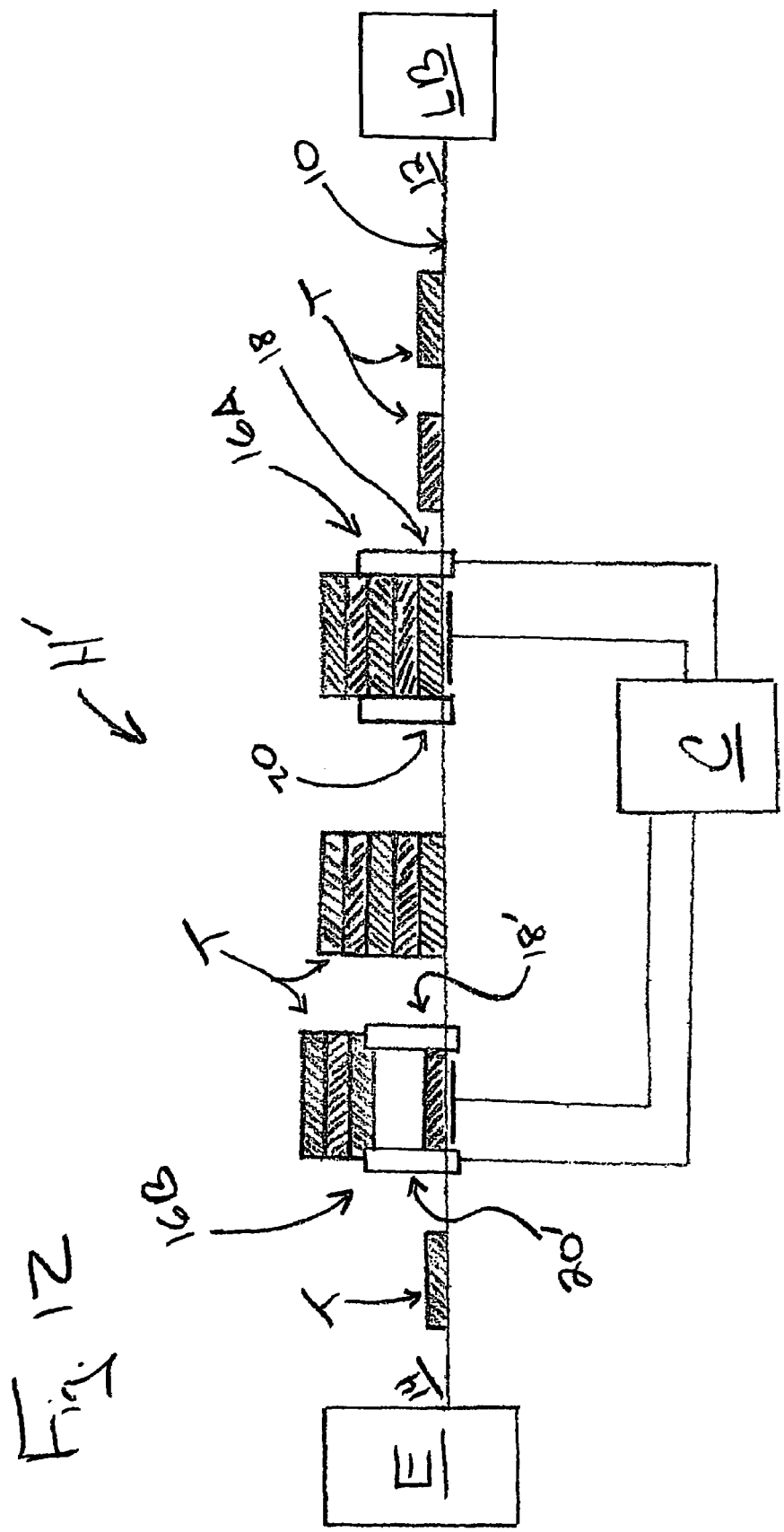

TRAY STACKING AND UNSTACKING CORNER GRIPPERS AND HANDLER

FIELD OF THE INVENTION

The present invention is directed to a tray handler for stacking and de-stacking ophthalmic prescription trays. The tray handler includes a plurality of spaced clamp assemblies defining a stack area along a conveyor, a lift plate, and first and second actuators. The lift plate is operably disposed within the stack area. The first actuator is operably associated with the clamp assemblies, which are inwardly and outwardly moveable relative to the lift plate upon actuation of the first actuator. The second actuator is operably associated with the lift plate, which is vertically moveable within the stack area upon actuation of the second actuator. A controller is in communication with the first and second actuators and controls actuation thereof. Methods of stacking and de-stacking ophthalmic prescription trays are also disclosed.

BACKGROUND OF THE INVENTION

Processing of ophthalmic lenses is often performed at high-volume finishing laboratories. Such finishing labs seek to maximize efficiency, increase yields, improve quality and reduce reliance on skilled technicians, often through automation of some or all of the processing steps. Finishing labs generally face a relatively large number of work orders for lens processing. As such, it is desirable that the orders are supplied to the processing equipment at optimal rates.

Generally, processing of lenses begins when an optical laboratory technician inputs the optical prescription from a work order for a pair of lenses in the laboratory's computer. The computer then provides a printout specifying information necessary for producing the required prescription. Appropriate lens blanks are selected based on this information, and the blanks are placed in a prescription tray along with the customer's eyeglass frames. The prescription tray typically remains with the lenses and frames throughout production. While various types of trays are used in the industry, most trays have a rectangular configuration with sides or corner posts having a standard height, and are stackable. The tray, along with the printout, frames and lens blanks, are then transferred to and from various processing machines, where the lenses are marked, blocked, edged and polished.

In order to maximize efficiency, it is desirable to have a supply of trays with lenses readily available for processing by a particular machine, such as an edger that cuts the lenses to a desired peripheral contour or shape. In addition, it is often desirable to stack the trays while the lenses therein await processing, or are being transported between processing stations, in order to maximize use of space in the laboratory.

SUMMARY OF THE INVENTION

The present invention relates to a tray handler for stacking and de-stacking ophthalmic prescription trays. The tray handler includes a plurality of spaced clamp assemblies defining a stack area along a conveyor, a lift plate operably disposed within the stack area, and first and second actuators. The first actuator is operably associated with the clamp assemblies. The clamp assemblies are inwardly and outwardly moveable relative to the lift plate upon actuation of the first actuator. The second actuator is operably associated with the lift plate. The lift plate is vertically moveable within the stack area upon actuation of the second actuator. A tray handler also includes a controller, which is in communication with the first and second actuators and controls actuation thereof.

The present invention also relates to a tray handler system for stacking and de-stacking ophthalmic prescription trays. The system includes a conveyor interconnecting a first location and a second location, and conveys a plurality of trays therebetween. A stacker is disposed along the conveyor. The stacker includes a plurality of clamp assemblies defining a stacking area along the conveyor. The stacker also includes a lift plate operably disposed with the stacking area, a first actuator operably associated with the clamp assemblies, and a second actuator operably associated with the lift plate. The clamp assemblies are inwardly and outwardly moveable relative to the lift plate upon actuation of the first actuator. The lift plate is vertically moveable within the stacking area upon actuation of the second actuator. The system also includes a de-stacker disposed along the conveyor and spaced from the stacker. The de-stacker includes a plurality of clamp assemblies defining a de-stacking area along the conveyor, a lift plate operably disposed with the de-stacking area, and first and second actuators. The first actuator is operably associated with the de-stacker's clamp assemblies, which are inwardly and outwardly moveable relative to the lift plate upon actuation of the first actuator. The second actuator is operably associated with the de-stacker's lift plate, which is vertically moveable within the de-stacking area upon actuation of the second actuator. The system also includes a controller in communication with the first and second actuators of the stacker, and the first and second actuators of the de-stacker, and controls actuation thereof.

A method of handling ophthalmic prescription trays is also disclosed. A plurality of trays is conveyed on a conveyor from a first location to a first tray handler. A stack of trays is formed in the first tray handler. The stack of trays is discharged from the first tray handler onto the conveyor. The discharged stack of trays is conveyed on the conveyor from the first tray handler to a second tray handler disposed along the conveyor. The stack of trays is de-stacked in the second tray handler. Each de-stacked tray is discharged from the second tray handler onto the conveyor. The discharged, de-stacked trays are conveyed from the second tray handler to a second location. The second location may include an edger apparatus.

A method of stacking ophthalmic prescription trays is disclosed. A first tray is conveyed on a conveyor into a stacking area. The first tray is raised upwardly and off the conveyor to a predetermined height. The first tray is clamped by closing a plurality of grippers against the first tray, thereby maintaining the first tray at the predetermined height above the conveyor. A second tray is conveyed into the stacking area. The second tray is raised upwardly and off the conveyor until the second tray contacts the first tray. The first tray is unclamped by opening the plurality of grippers. The second tray is raised to the predetermined height. The second tray is clamped by closing the plurality of grippers against the second tray, thereby maintaining the first and second trays in a stack above the conveyor.

A method of de-stacking ophthalmic prescription trays is also disclosed. A stack of trays is conveyed on a conveyor into a de-stacking area. The stack of trays is raised upwardly and off the conveyor to a predetermined height. A second to lowest tray in the stack is clamped by closing a plurality of grippers against the second to lowest tray, thereby maintaining the second to lowest tray at the predetermined height while maintaining the stack above the conveyor. The lowest tray in the stack is lowered onto the conveyor, thereby de-stacking the lowest tray from the stack.

BRIEF DESCRIPTION OF THE DRAWINGS

FIG. 4 is an exploded assembly view of a gimbaled gripper assembly on the tray handler;

FIG. 5 is a bottom perspective view of the stacker/de-stacker showing an actuator plate in a first position;

FIG. 6 is a bottom perspective view of the stacker/de-stacker showing an actuator plate in a second position;

FIG. 7 is a rear perspective view of a stacker/de-stacker;

FIG. 8 is a perspective view of a prescription tray having a job ticket therein;

FIG. 9 is a perspective view of a support beam and air nozzles associated with the stacker;

FIG. 12 is a schematic of a tray handler system according to an embodiment of the present invention.

DETAILED DESCRIPTION OF THE INVENTION

Prescription trays used in an ophthalmic lens processing centers are known in the art. As shown in FIG. 8, a prescription tray T typically has a rectangular base B with sides S and corner portions C having a standardized height. Sides S may have a height less than the height of the corner portions C. Trays T typically are made from a plastic material. The trays T may have a metal insert to allow the presence of a tray T to be detected by an inductive sensor.

Figure 1:
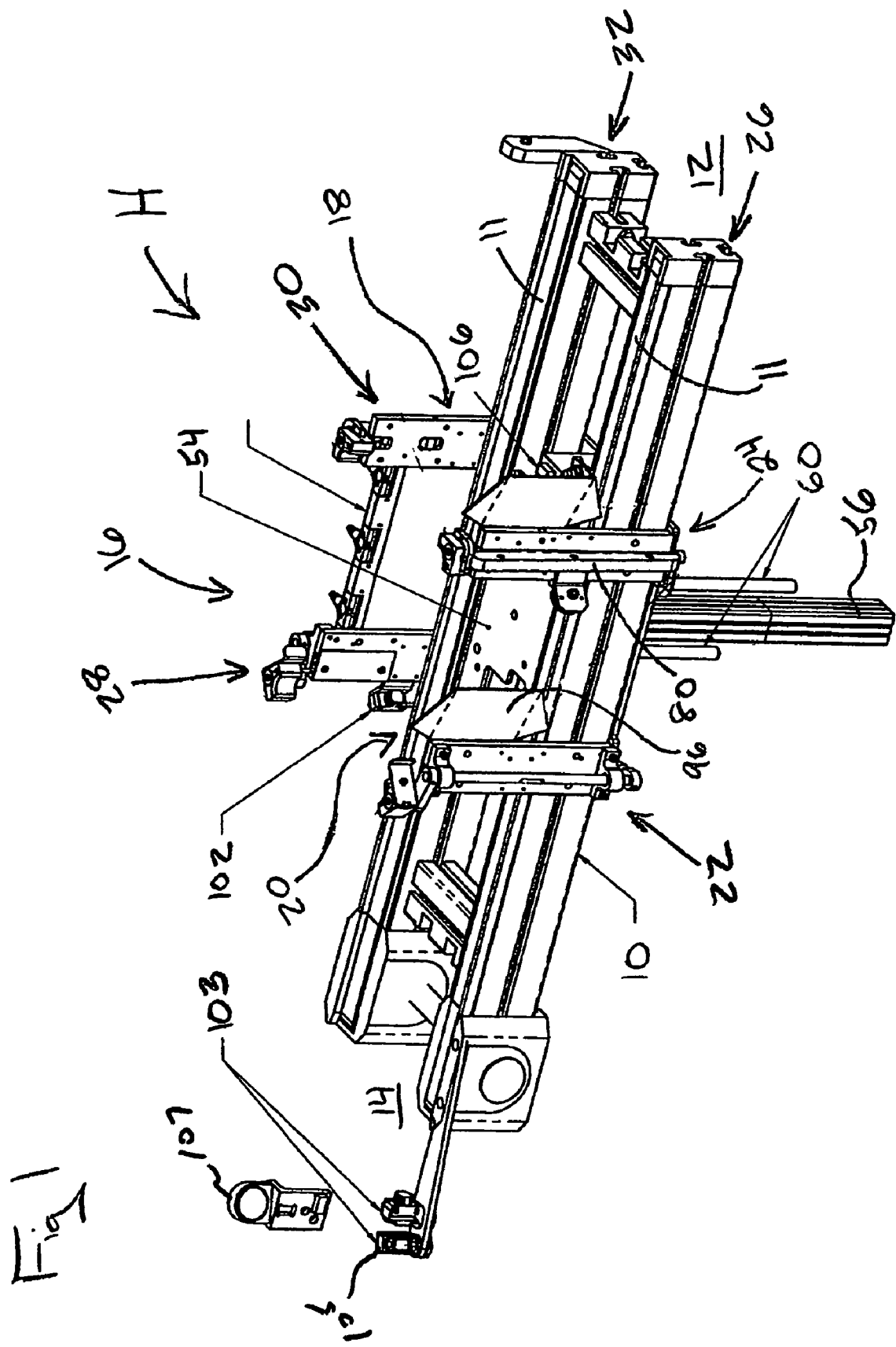
FIG. 1 is a top perspective view of a tray handler according to an embodiment of the present invention.
Figure 2:
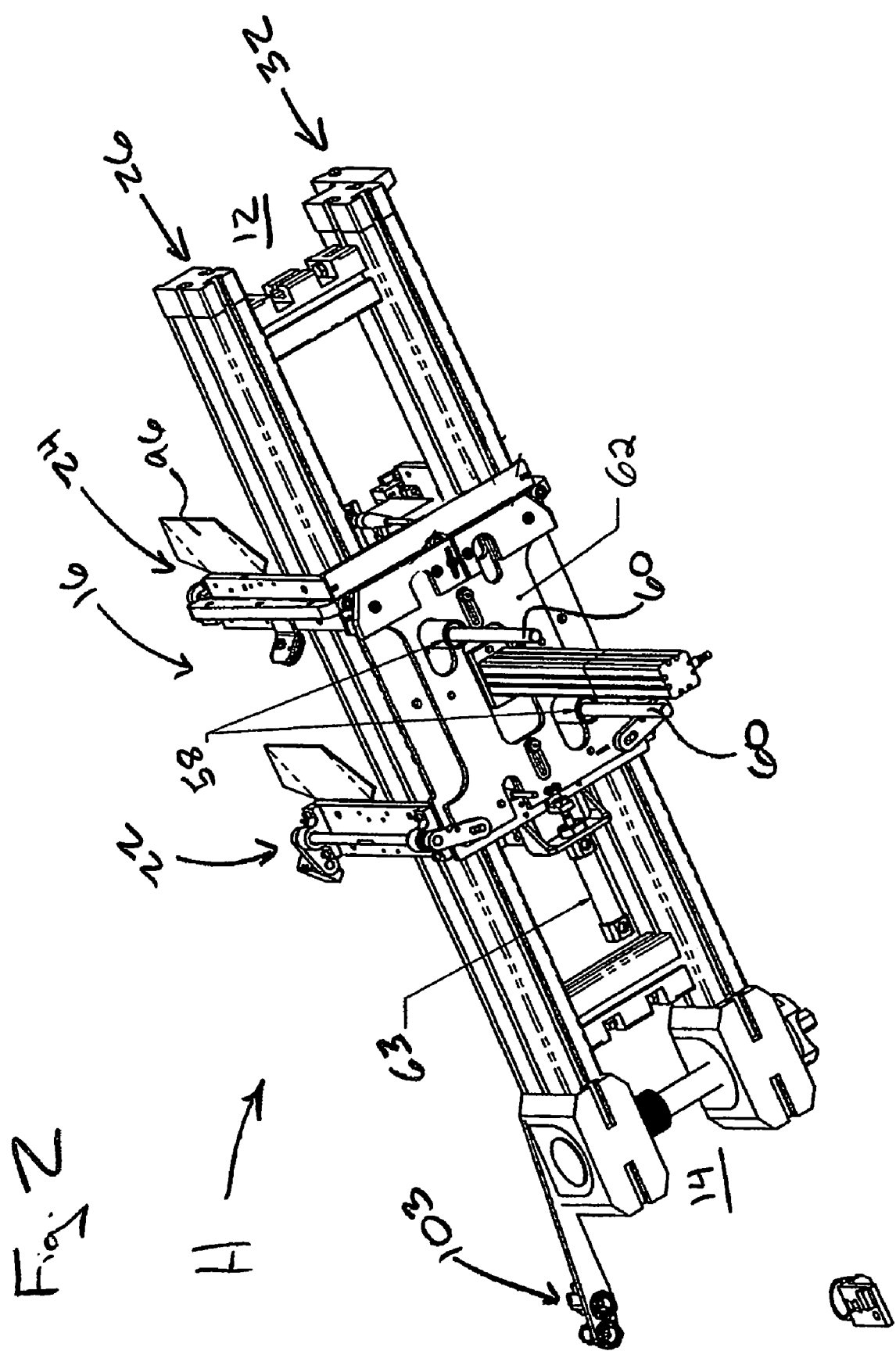
FIG. 2 is a bottom perspective view of the tray handler.

As best shown in FIGS. 1 and 2, the present invention is directed to a tray handler H for stacking and de-stacking a plurality of trays, such as trays T. Tray handler H preferably includes a conveyor 10 that interconnects a first location 12 and a second location 14 for conveying trays T therebetween. Conveyor 10 preferably includes first and second parallel driven belts 11 sufficiently spaced so that base B of tray T rests on and is conveyed by both belts 11.

A stacker 16 is operably associated with conveyor 10, and is intermediate first and second locations 12, 14. Stacker 16 includes an entry end 18 proximate first location 12 in which trays T are fed into stacker 16 via conveyor 10, and an exit end 20 proximate second location 14 from which a stack of trays T are discharged from stacker 16 onto conveyor 10. As explained below, tray handler H may be configured so that stacker 16 either forms stacks of trays T or un-stacks stack of trays T. For purposes of explanation, stacker 16 will first be described with tray handler H configured for stacking trays T.

Stacker 16 preferably includes first and second spaced clamp assemblies 22, 24 connected to and disposed along a first side 26 of conveyor 10. Third and fourth spaced clamp assemblies 28, 30 are connected to and disposed along a second side 32 of conveyor 10 opposite first side 26. First and third clamp assemblies 22, 28 are proximate stacker exit end 20, and second and fourth clamp assemblies 24, 30 are proximate stacker entry end 18. Clamp assemblies 22, 24, 28, 30 define therebetween a stacking area along conveyor 10.

Figure 3:
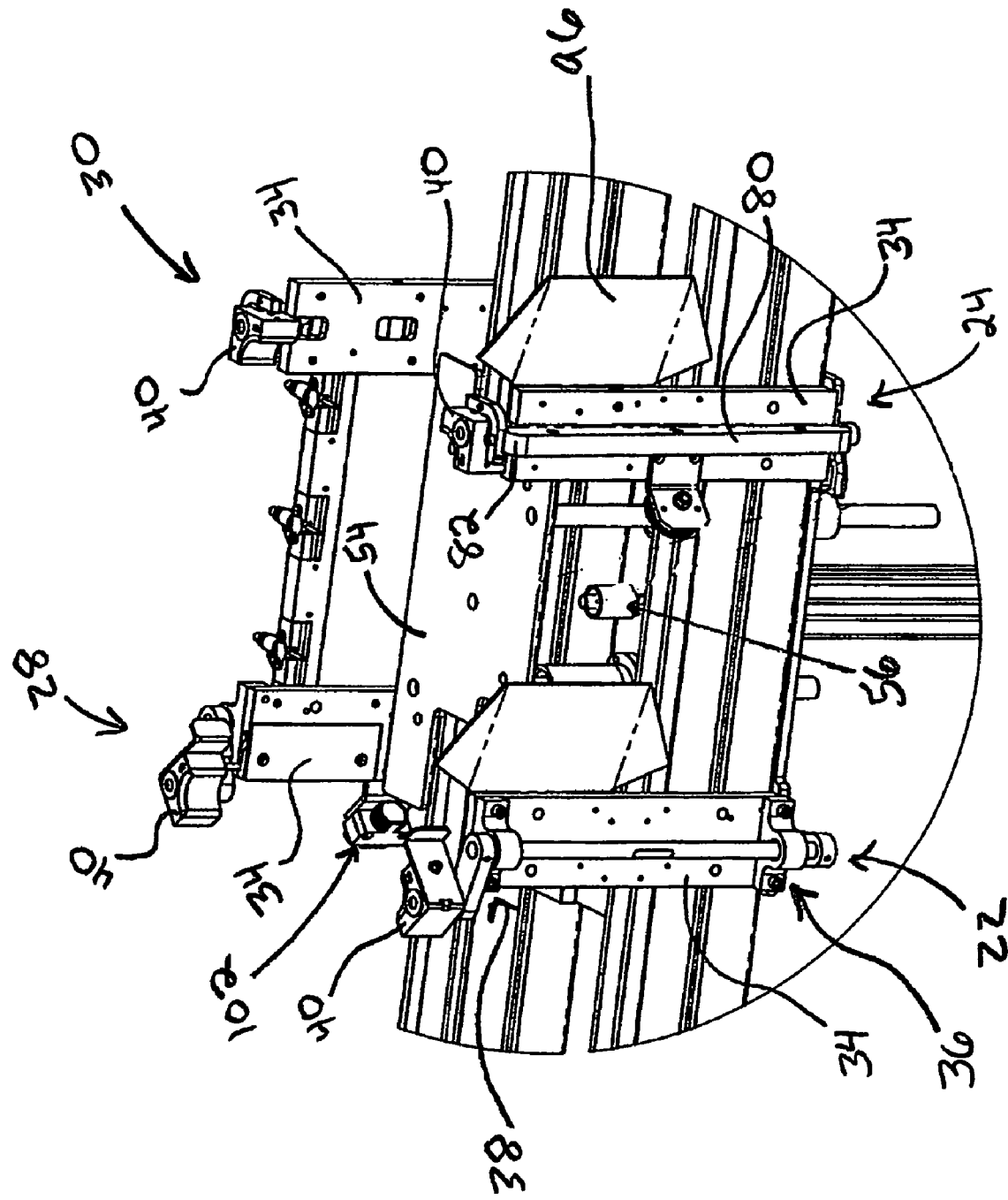
FIG. 3 is a fragmentary perspective view of a stacker/de-stacker portion of the tray handler.

As best shown in FIG. 3, each clamp assembly 22, 24, 28, 30 includes a bracket 34 having first and second opposite ends 36, 38. Bracket first end 36 is connected to a corresponding side 26 or 32 of conveyor 10. A gimbaled gripper assembly 40 is connected to bracket second end 38.

As best shown in FIG. 4, each gripper assembly 40 has a body portion 42 with a bore 44 extending therethrough, and a gripper surface 45. Gripper surface 45 is configured for gripping a corner portion C or side S of a tray T. Gripper surface 45 may be integrally formed with body portion 42. Alternatively, gripper surface 45 may be secured to body portion 42. In addition, gripper surface 45 may be L-shaped for gripping two surfaces of corner portion C of tray T. A support post 46 is connected to bracket second end 38. Support post 46 is disposed in bore 44, and body portion 42 is secured thereon using a fastener such as a washer and screw 48. Support post 46 includes a central flange 50 that acts as a fulcrum, so that body portion 42 is gimbaled thereon. First and second elastomeric flanges 52, such as O-rings, are also preferably disposed on support post 46, with central flange 50 being intermediate elastomeric flanges 52. Elastomeric flanges 52 act as cushions against which body portion 42 pivots against. In this way, gripper surface 45 may conform to the side portion S or corner portion P of tray T. Many prescription trays are formed from plastic, and their sides sometimes include a slight inward or outward bend or draft. The gimbaled connection of body portion 42 on support post 46 ensures that gripper surface 45 will properly contact the side S or corner C when gripper assemblies 40 are actuated. In addition, elastomeric flanges 52 tend to re-align gripper assemblies 40 back to a neutral or 'straight' position on support post 46 after pressure is no longer being applied to gripper surface 45.

Referring to FIGS. 1-3, stacker 16 includes a lift plate 54 operably associated with conveyor 10 and disposed within the stacking area. A lift cylinder 56, preferably pneumatically powered is operably associated with lift plate 54 for raising and lowering lift plate 54 relative to conveyor 10. Preferably, lift plate 54 is moveable in a direction substantially perpendicular to the direction of movement of belts 11 of conveyor 10. As best shown in FIG. 3, lift plate 54 is not secured to lift cylinder 56. Lift cylinder 56 has a piston that raises lift plate 54. However, as lift cylinder 56 and its cooperating piston is retracted, lift plate 54 is lowered by gravity. Safety is enhanced because lift plate 54 is not driven downward by lift cylinder 56 as it is being lowered. Thus, if a user's hand or other object is accidentally left in the path of lift plate 54 as it is being lowered, no injury to the user or to tray handler H will result. A user may easily pull his or her hand out from under lift plate 54 even after lift cylinder 56 is fully retracted. Preferably, lift bearings 58 are provided on the underside of lift plate 54, which cooperate with lift guide rods 60 to guide lift plate 54 along its path of movement as its is being either raise or lowered. Lift cylinder 56 is preferably a three position pneumatic cylinder, so that lift plate 54 may be raised and stopped at first and second heights above belts 11 of conveyor 10, as well as the retracted position. Movement of lift plate 54 for stacking and de-stacking trays T will be described in detail below.

As best shown in FIGS. 5 and 6, tray handler H preferably includes an actuator plate 62 having first and second opposite ends 64, 66. Actuator plate 62 is disposed under lift plate 54 and within the stacking area. First and third clamp assemblies 22, 28 are coupled to actuator plate first end 64. Preferably, first and third clamp assemblies 22, 28 each include a pivot clamp arm 68 having a first end 70 pivotally connected to support post 46 and a second opposite end 72 connected to a pivot rod 78, as best shown in FIGS. 4, 5 and 6. Pivot rod 78 is preferably substantially perpendicular to the corresponding pivot clamp arm 68. First end 64 of actuator plate 62 includes first and second actuator arms 74, 76 pivotally connected to and extending outwardly from actuator plate 62, as best shown in FIGS. 5 and 6. The free ends of first and second actuator arms 74, 76 are connected to pivot rods 78, thereby pivotally connecting gripper assemblies 40 to first end 64 of actuator plate 62.

Actuator plate 62 is moveable between a first position A, as shown in FIG. 5, and a second position B, as shown in FIG. 6. An actuator 63, such as a pneumatic cylinder, is provided, which is connected to actuator plate 62 via a rod 65. Rod 65 is extended or retracted via actuation of actuator 63, thereby causing movement of actuator plate 62. The path of movement between positions A and B is preferably substantially perpendicular to the path of movement of lift plate 54. When actuator plate 62 is in first position A, first and third clamp assemblies 22, 28 are in an 'open' position, whereby the corresponding gimbaled gripper assemblies 40 are pivoted outwardly and away from the stacking area. Gripper assemblies 40 do not hinder the movement of a stack of trays T exiting tray handler H when first and third assemblies 22, 28 are in the open position and actuator plate 62 is in first position A.

As actuator plate 62 moves from first position A to second position B, actuator arms 74, 76 pivot, causing pivot rods 78 to rotate. The rotation of pivot rods 78, in turn, cause pivot clamp arms 68 to pivot, thereby forcing body portions 40 of gripper assemblies 40 to move inwardly toward the stacking area in a 'closed' position. When moved into the closed position, body portions 42 and gripper surfaces 45 are sufficiently spaced and configured to grip the corners C and/or sidewalls S of a tray T disposed within the stacking area.

Second and fourth clamp assemblies 24, 30 may be coupled to actuator plate 62 as described above for first and third clamp assemblies 22, 28. Alternatively, each of second and fourth clamp assemblies 24, 30 may be connected to corresponding brackets 34 via lever arms 80. Each lever arm 80 has first and second opposite ends 82, 84. Lever arm 80 is pivotally connected to bracket 34 at point intermediate ends 82, 84, so that ends 82, 84 may be pivoted inwardly and outwardly relative to the stacking area. In addition, as end 82 is pivoted inwardly, end 84 is pivoted outwardly, and vice versa, as best shown in FIGS. 5 and 6.

Each gripper assembly 40 of second and fourth clamp assemblies 24, 30 is connected to first end 82 of lever arm 80, as best shown in FIGS. 1 and 3. Preferably, body portion 42 is directly connected to first end 82 so that there is no pivotal movement between gripper assembly 40 and first end 82. Second end 84 of lever arm cooperates with second end 66 of actuator plate 62, such that second end 84 is pushed outwardly by second end 66 when actuator plate 62 is moved from first position A to second position B, as best shown in FIGS. 5 and 6.

Preferably, actuator plate 62 includes first and second cams 86, 88 secured to an underside 90 of second end 66 of actuator plate 62. Each cam 86, 88 engages a cam follower 92 connected to second end 84 of a corresponding lever arm 80. Each cam 86, 88 preferably has angled edge 94 extending outwardly from actuator plate 62 and aligned with cam follower 92 when actuator plate 62 is in first position A, as best shown in FIG. 5. Cam follower 92 preferably has a cylindrical configuration, with the circular sides engaging cams 86, 88 as actuator plate 62 is moved from first position A to second position B, as shown in FIG. 6. Angled edges 94 are pushed into cam followers 92, thereby forcing cam followers 92 outwardly and away from actuator plate 62. Second end 84 of lever arm 80 is thereby moved outwardly and away from the stacking area, while first end 82 of lever arm 80 is moved inwardly and toward the stacking area. In this way, gripper assemblies 40 of second and fourth clamp assemblies 24, 30 are moved inwardly when actuator plate 62 is moved into second position B, thereby forcing gripper surfaces 45 against tray T. Second end 84 of lever arm 80 is preferably sufficiently weighted and/or lever arm 80 is pivotally secured to bracket 34 at a central position that permits lever arm 80 to easily return to its initial 'open' position when actuator plate 62 is moved back to position A from position B. Lever arms 80 may also be biased to the initial open position, shown in FIG. 5, using springs, for example.

First and second cams 86, 88 may be slideably secured to underside 90 of actuator plate 62, so that the distance between angled edges 94 of cams 86, 88, respectively, may be adjusted. In this way, the amount of inward and outward movement of gripper assemblies 40 may be adjusted. Such adjustment may be desirable in order to account for trays of varying width. Thus, handler H may be 'tuned' to account for the particular dimensions of trays T to be stacked or de-stacked.

As best shown in FIGS. 1, 2, 3 and 7, tray handler H may include paper guides 96 extending outwardly from and connected to brackets 34 of first and second clamp assemblies 22, 24. Typically, a printed sheet of paper having information necessary for processing lenses, or 'job ticket' J, is provided in each prescription tray T, along with the lenses and frames, as best shown in FIG. 8. The job ticket J is sometimes slipped into a slot provided on the tray T, or placed upright such that the paper sheet extends upwardly beyond the height of sides S and/or corners C. The job ticket J may flop or be folded outwardly such that it would catch on bracket 34 as it enters the stacking area. Paper guides 96 ensure that job ticket J and tray T are properly guided into the stacking area without catching on bracket(s) 34 as tray T either enters or exits the stacking area.

Paper guides 96 preferably include a side edge 98 that is fastened onto brackets 34 using bolts, screws, pins or the like, as best shown in FIG. 7. A major planar portion 100 extends outwardly from side edge 98 away from brackets 34. Major planar portion 100 is preferably angularly disposed relative to side edge 98, extending outwardly away from the stacking area. The angle of major planar portion 100 relative to side edge 98 and/or first side 26 of conveyor 10 may be adjusted by simply bending major planar portion 100. Paper guides 96 should extend outwardly from first side 26 of conveyor 10 at an angle sufficient to engage and guide any portion of job ticket J that may be extending outwardly from sidewalls S of tray T into the stacking area.

Tray handler H may include a first sensor 102 disposed within or proximate the stacking area, as best shown in FIGS. 1, 3 and 6, which senses when a tray T is disposed at a predetermined position within the stacking area. First sensor 102 may be a photovoltaic sensor. Alternatively, an inductive position sensor may be provided, which is disposed adjacent a cut-out portion 104 of lift plate 54, as best shown in FIG. 7. Trays T may be fitted with a metal piece on their base B, which is detected by the inductive position sensor when tray T is disposed at the predetermined position within the stacking area. It should be understood that various types of position sensors may be used, so long as first sensor 102 is able to detect the position of tray T at the predetermined position within the stacking area.

First sensor 102 is in communication with lift cylinder 56 via a CPU or other control mechanism (not shown). As described above, lift cylinder 56 is operably associated with lift plate 54, which is raised or lowered as lift cylinder 56 is extended or retracted.

A second sensor 103 may be provided at a position proximate second location 14, as best shown in FIGS. 1 and 2. Second sensor 103 may be an optical sensor. Second sensor 103 also detects the position of tray T at the predetermined position within the stacking area. Second sensor 103 is in communication with conveyor 10 via CPU or other control mechanism. Optical sensor 105 transmits a beam of light to retro reflector 107. The passage of tray T causes the beam to be blocked, thereby indicating the presence of a tray T. After the tray continues its transit, the reflected beam is detected by sensor 105, thereby indicating that another tray T may commence its transit. Activation of first and second sensors 102, 103 will be described more fully below.

Tray handler may also include a tray stop 106 disposed between belts 11 and adjacent entry end 18 of stacker 16 outside of the stacking area. Tray stop 106 is upwardly moveable into the path of trays T being conveyed on conveyor 10. When lift cylinder 56 is activated, tray stop 106 is also caused to move upwardly and into the path of trays T being conveyed, thereby preventing any other trays on conveyor 10 from entering the stacking area after lift plate 54 has been raised. A separate actuator is provided for actuating tray stop 106. Tray stop 106 may be lowered out of the path of trays T when the stacking area is ready to receive another tray T. Tray stop 106 may be in communication with the control mechanism, which controls movement thereof.

As best shown in FIGS. 7 and 9, tray handler H may include at least one air nozzle 108, which may be connected to second side 32 of conveyor 10 intermediate third and fourth clamp assemblies 28, 30. Air nozzle 108 is connected to a source of high pressure air (not shown) so that an air stream is expelled from nozzle 108 into the stacking area, preferably toward first side 26 of conveyor 10 intermediate first and second clamp assemblies 22, 24. Tray handler H may include more than one air nozzle 108, such as three air nozzles 108 as shown in FIGS. 7 and 9.

A support beam 110 may be connected to and extending between brackets 34 of third and fourth clamp assemblies 28, 30. Air nozzles 108 are connected to support beam 110. Preferably, air nozzles 108 are pivotally connected to support beam 110, as best shown in FIG. 9. In this way, the direction of the air stream expelled from air nozzles 108 may be adjusted and directed toward a specific location in the stacking area, as shown by arrows X and Y.

Figure 10A:
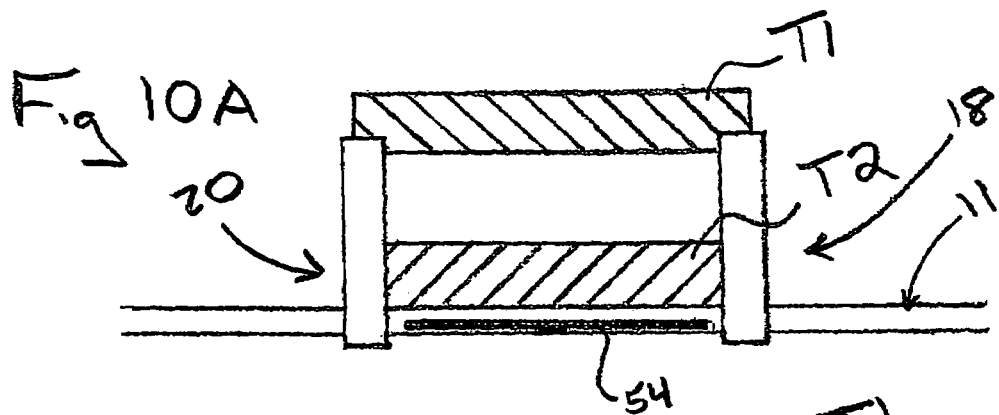
FIG. 10A is a schematic of a tray handler configured as a stacker in a first orientation.

As noted above, tray handler H may be configured for either stacking or de-stacking trays T. Referring to FIGS. 10A through 10D, operation of tray handler H configured as a stacker will be described. As shown in FIG. 10A, a first tray T1 is already secured between gripper assemblies 40 of first, second, third and fourth clamp assemblies 22, 24, 28, 30, which are in the 'closed' position as shown in FIG. 6. Actuator plate 62 is therefore in second position B. A second tray T2 has entered the stacking area on conveyor 10 through entry end 18, and is disposed above lift plate 54 in a first predetermined position, as shown in FIG. 10A. The base B of tray T2 rests on belts 11 of conveyor 10 in the first predetermined position.

Figure 10B:
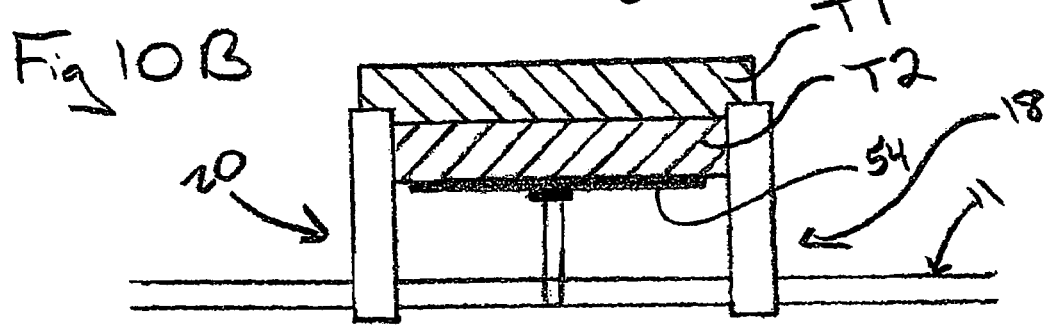
FIG. 10B is a schematic of the stacker in a second orientation.

Tray T2 is aligned with tray T1 in the first predetermined position. Tray T2 is detected by sensors 102 and 103 in the first predetermined position. Sensors 102, 103 send a signal to a corresponding control mechanism, which then causes conveyor 10 to stop moving. Tray stop 106 is also raised to stop any other trays from entering the stacking area. Lift cylinder 56 is actuated so that lift plate 54 is raised to a first height, as best shown in FIG. 10B. Tray T2 is thereby raised upwardly toward tray T1 to a second predetermined position when lift plate 54 reaches the first height, wherein the upper edges of the sides S or corners C of tray T2 contacts the base B of tray T1. Trays T1, T2 are preferably configured so that the upper edges of the sides S or corners C of one tray are nested into the corresponding base B of the other tray.

As tray T2 is lifted off conveyor belts 11 from the first to second predetermined positions, air nozzles 108 are activated so that the air streams being expelled therefrom moves the upper edge of job ticket J extending above sides S of tray T2 outwardly. The direction of the air streams may be adjusted by pivotally adjusting nozzles 108, as described above. In this way, job ticket J does not hamper tray T2 from nesting into tray T1.

When lift plate 54 reaches the first height, rod 65 is retracted by actuator 63 causing actuator plate 62 to move to first position A, as shown in FIG. 5. Thus, the control mechanism is in communication with actuator 63 and lift cylinder 56 via sensors or position detectors. As actuator plate 62 moves into first position A, gripper assemblies 40 of first, second, third and fourth clamp assemblies 22, 24, 28, 30 are 'opened', thereby releasing tray T1. However, trays T1 and T2 are supported by lift plate 54 as shown in FIG. 10B.

Figure 10C:
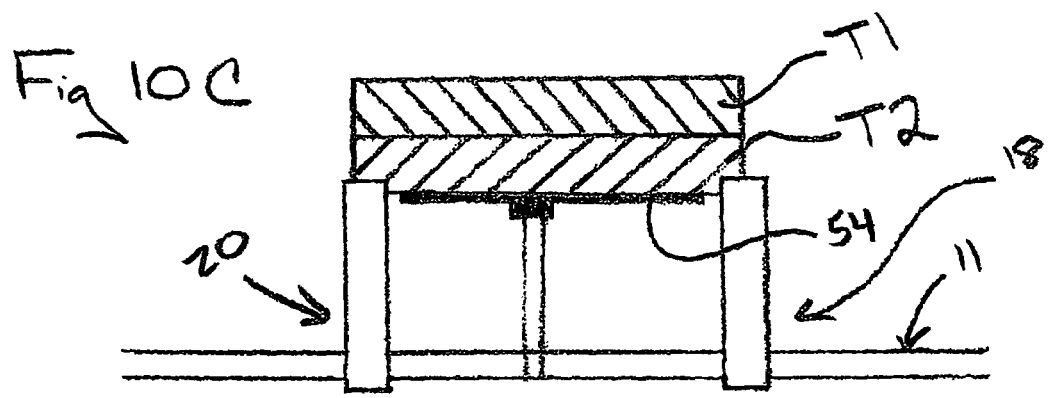
FIG. 10C is a schematic of the stacker in a third orientation.
Figure 10D:
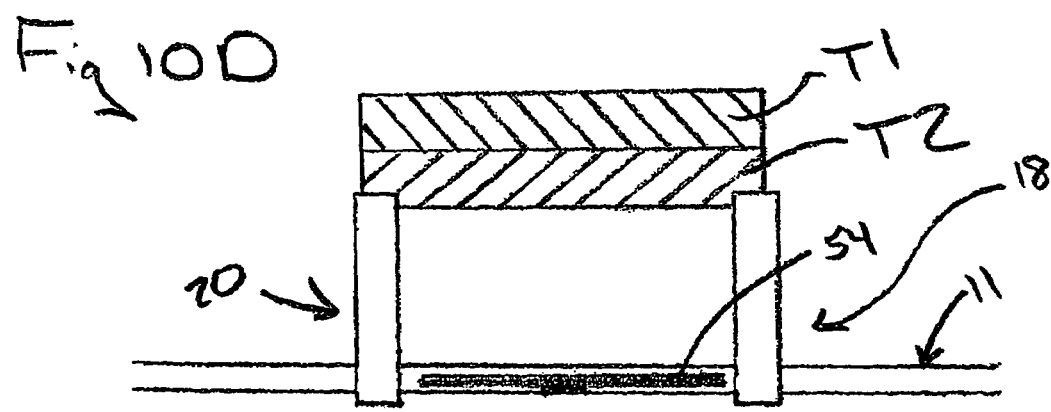
FIG. 10D is schematic of the stacker in a fourth orientation.

Lift cylinder 56 is then actuated so that lift plate 54 is raised to a second height, as best shown in FIG. 10C. Trays T1 and T2 are thereby raised upwardly to a third predetermined position when lift plate 54 reaches the second height, wherein the sides S or corners C of tray T2 are aligned with gripper assemblies 40 of first, second, third and fourth clamp assemblies 22, 24, 28, 30. Upon lift plate 54 reaching the second height, actuator 63 is again actuated so that rod 65 is extended causing actuator plate 62 to move back to second position B, as shown in FIG. 6. As actuator plate 62 moves back to first position B, gripper assemblies 40 are 'closed' thereby clamping the sides S and/or corners C of tray T2. Lift cylinder 56 is then retracted so that lift plate 54 is lowered to a point below belts 11 of conveyor 10, as shown in FIG. 10D. As noted above, lift plate 54 is preferably decoupled from lift cylinder 56, and is lowered by gravity. When lift plate 54 is completely lowered, conveyor 10 is re-started. Tray stop 106 is also lowered so that the stacking area is ready to receive another tray.

The cycle shown in FIGS. 10A-10D therefore may be repeated until a desired number of trays are stacked. The associated controller or CPU may be programmed so that a desired number of trays are stacked by tray handler H. A stack of trays is then released from stacker 16 onto conveyor 10 from exit end 20. The cycle is slightly different when the last tray to be stacked reaches the stacking area. The final tray in a stack (which will be the bottom tray of the stack) is moved from the first predetermined position, as shown in FIG. 10A, to the second predetermined position, as shown in FIG. 10B as described above. As such, lift plate 54 is moved upwardly to the first height, and clamp assemblies 40 are opened. Then, lift plate 54 is re-lowered to its initial position below belts 11, as shown in FIG. 10A. Therefore, lift plate 54 does not proceed to the second height when stacking the final tray in a stack. As such, the gripper assemblies 40 remain open. Therefore, the entire stack of trays is lowered down onto belts 11. Conveyor 10 is re-started, and the stack is discharged from exit end 20 toward second location 14.

First and third clamp assemblies 22, 28, which are proximate exit end 20 as shown in FIGS. 1 and 2, pivot outwardly from the stacking area a sufficient distance to permit a stack of trays to pass therebetween. First and third clamp assemblies 22, 28 are able to pivot outwardly due to their pivotal connection via clamp pivot arms 68. Second and fourth clamp assemblies 24, 30 need not pivot outwardly given a full stack of trays does not pass through entry end 18 when tray handler H is configured for stacking trays. As such, second and fourth clamp assemblies 24, 30 simply move in and out via lever arms 80.

Tray handler H may also be configured for de-stacking previously stacked sets of trays T, as best shown in FIGS. 11A-11D. When configured as a de-stacker, tray handler H is virtually identical to the configuration described for stacking trays. However, there are several differences with stacker 16. When configured as a de-stacker, pivoting first and third clamp assemblies 22, 28 of stacker 16 are preferably disposed proximate entry end 18, given a full stack of trays enters the de-stacking area, instead of exiting when trays T are being stacked. As such, clamp assemblies 40 of first and third clamp assemblies 22, 28 may pivot out of the way of the stack of trays entering the de-stacking area. Accordingly, second and fourth clamp assemblies 24, 30 are disposed proximate exit end 20. In addition, tray handler H need not include air nozzles 108 when configured as a de-stacker, given job tickets J will not hamper the trays T from being de-stacked.

Figure 11A:
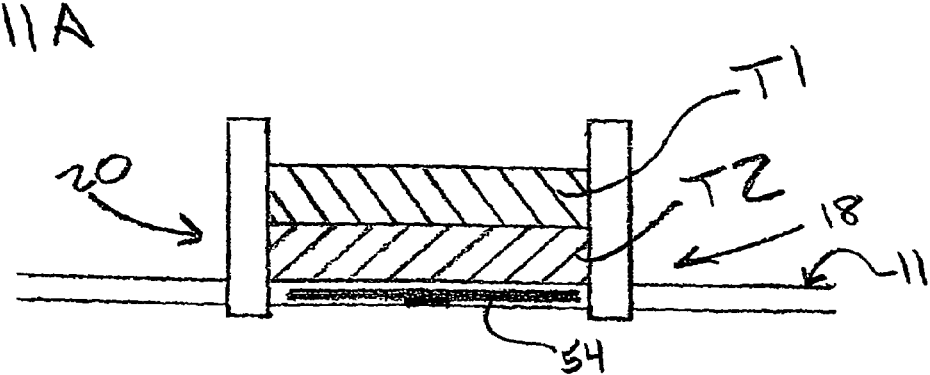
FIG. 11A is a schematic of a tray handler configured as a de-stacker in a first orientation.

In addition, the movement of clamp assemblies 40 and lift plate 54 is slightly different when tray handler H is configured for de-stacking a stack of trays, as shown in FIGS. 11A-11D. A stack of trays T1, T2 enters the de-stacking area through entry end 18. When the stack is disposed above lift plate 54 in the first predetermined position, as best shown in FIGS. 11A, the stack is detected by sensors 102 and/or 103, or by an inductive position sensor as described above. Lift plate 54 is in an initial position just below belts 11 of conveyor 10. In this initial position, clamp assemblies 22, 24, 28, 30 are in the 'open' position, as shown in FIG. 5. Thus, actuator plate 62 is in first position A.

Figure 11B:
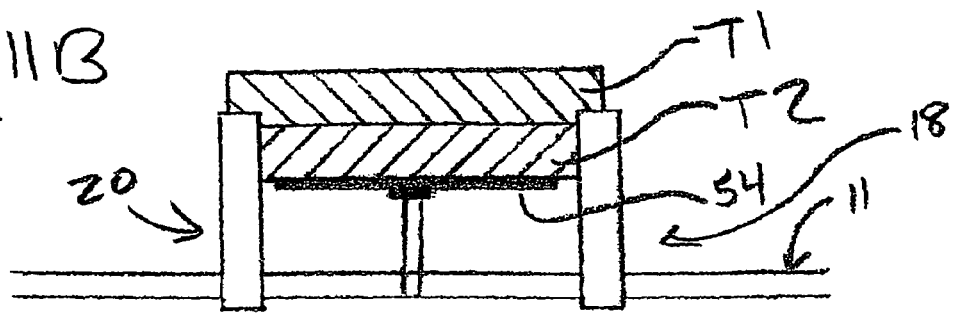
FIG. 11B is a schematic of the de-stacker in a second orientation.

After the stack has been detected in the de-stacking area, the associated control mechanism causes conveyor 10 to stop moving. Tray stop 106 may also be raised to prevent any other stacks from entering the de-stacking area. Lift cylinder 56 is actuated so that lift plate 54 is raised to the first height, as best shown in FIG. 11B. The stack is thereby raised upwardly to the second predetermined position when lift plate 54 reaches the first height. Rod 65 is extended by actuator 63 causing actuator plate 62 to move to second position B, as shown in FIG. 6. As actuator plate 62 moves from first position A to second position B, gripper assemblies 40 of first, second, third and fourth clamp assemblies 22, 24, 28, 30 are 'closed'. When lift plate 54 is at the first height, gripper assemblies 40 are aligned with tray T1, or the second to lowest tray in the stack. Thus, the second to lowest tray T1 is grasped by gripper assemblies 40. Tray T2 remains supported by lift plate 54.

Figure 11C:
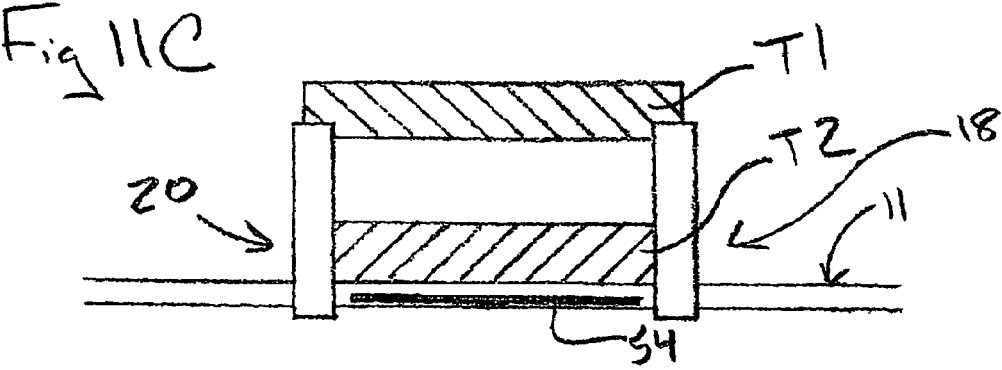
FIG. 11C is schematic of the de-stacker in a third orientation.

Lift cylinder 56 is then retracted so that lift plate 54 is lowered to a point below belts 11 of conveyor 10, as shown in FIG. 11C. Lift plate 54 de-stacks tray T2 from the stack, which is thereby lowered onto conveyor 10. Conveyor 10 is re-started, and un-stacked tray T2 is discharged from the de-stacking area.

Figure 11D:
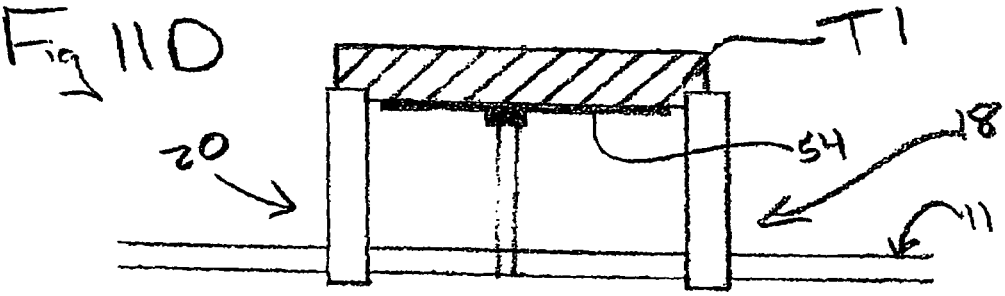
FIG. 11D is a schematic of the de-stacker in a fourth orientation.

Lift plate 54 is then raised to the second height which is just beneath tray T1, as shown in FIG. 11D. If tray T1 is the last tray in the stack, as shown in FIG. 11D, lift plate 54 is lowered to a point below belts 11 of conveyor 10, as shown in FIG. 11C. Tray T1 is thereby lowered onto conveyor 10, and discharged from the de-stacking area.

However, if tray T1 is not the last tray in the stack, lift plate is moved from the second height, shown in FIG. 11D, to the first height, shown in FIG. 11B. Grippers assemblies 40 are then closed, thereby gripping the tray stacked above tray T1 (not shown). The process shown in FIGS. 11B-11D is repeated until all trays are de-stacked. The de-stacker may be controlled to account for the last two trays T1, T2 in a stack, in which case the step shown in FIG. 10B is not necessary when only two trays T1, T2 remain in the stack.

The CPU and/or control mechanism may be programmed so that tray handler H stacks or de-stacks a predetermined number of trays T per stack. As noted above, movement of lift plate 54 is adjusted to account for the final tray being stacked or de-stacked. For example, each stack may include five trays T. Thus, the cycles shown in FIGS. 10A-D and 11A-D are modified to account for the final tray being stacked or de-stacked.

As best shown in FIG. 12, a tray handler system H' is disclosed which stacks and de-stacks trays T. System H' includes a stacker 16A and a de-stacker 16B, each of which are configured as described above. Stacker 16A includes entry end 18 into which trays T are conveyed by conveyor 10 from first location 12, and an exit end 20 from which a stack of trays are discharged. Thus, stacker 16A is configured and controlled for stacking trays T, as described above with reference to FIGS. 10A-10D. De-stacker includes an entry end 18' into which the stack of trays T are conveyed by conveyor 10 from stacker 16A, and an exit end 20' from which de-stacked trays T are discharged. De-stacker 16B is configured and controlled for de-stacking trays T, as described with reference to FIGS. 11A-11D.

Conveyor 10 interconnects a first location 12 and a second location 14, conveying a plurality of trays T therebetween. Processing equipment, such as an edger, surfacer, blocker, coating machine, etc., may be provided at first and/or second locations 12, 14. For example, a lens blocker LB may be provided at first location 12, and an edger E or edgers E may be provided at second location 14. Stacker 16A receives trays T from first location 12, and discharges stacks of trays T back onto conveyor 10 toward de-stacker 16B. A controller C is preferably in communication with lift cylinder 56 and actuator 63 associated with stacker 16A, as well as lift cylinder 56 and actuator 63 associated with de-stacker 16B. Controller C is also preferably in communication with conveyor 10. Controller may also be in control of blocker LB and edger E.

System H' transports a plurality of prescription trays from first location 12, such as blocker LB or other processing equipment, to the stacker 16A. The prescription trays are stacked, thereby efficiently moving the trays T along to another processing station, which also saving space by automatically stacking the trays T. The stacks may then be transported to another processing area, such as an edging apparatus E, via conveyor 10. Prior to reaching edger E, however, the stacks are de-stacked. In this way, a supply of de-stacked prescription trays are ready for processing by edger E, thereby maximizing space and efficiency.

Figure 13:
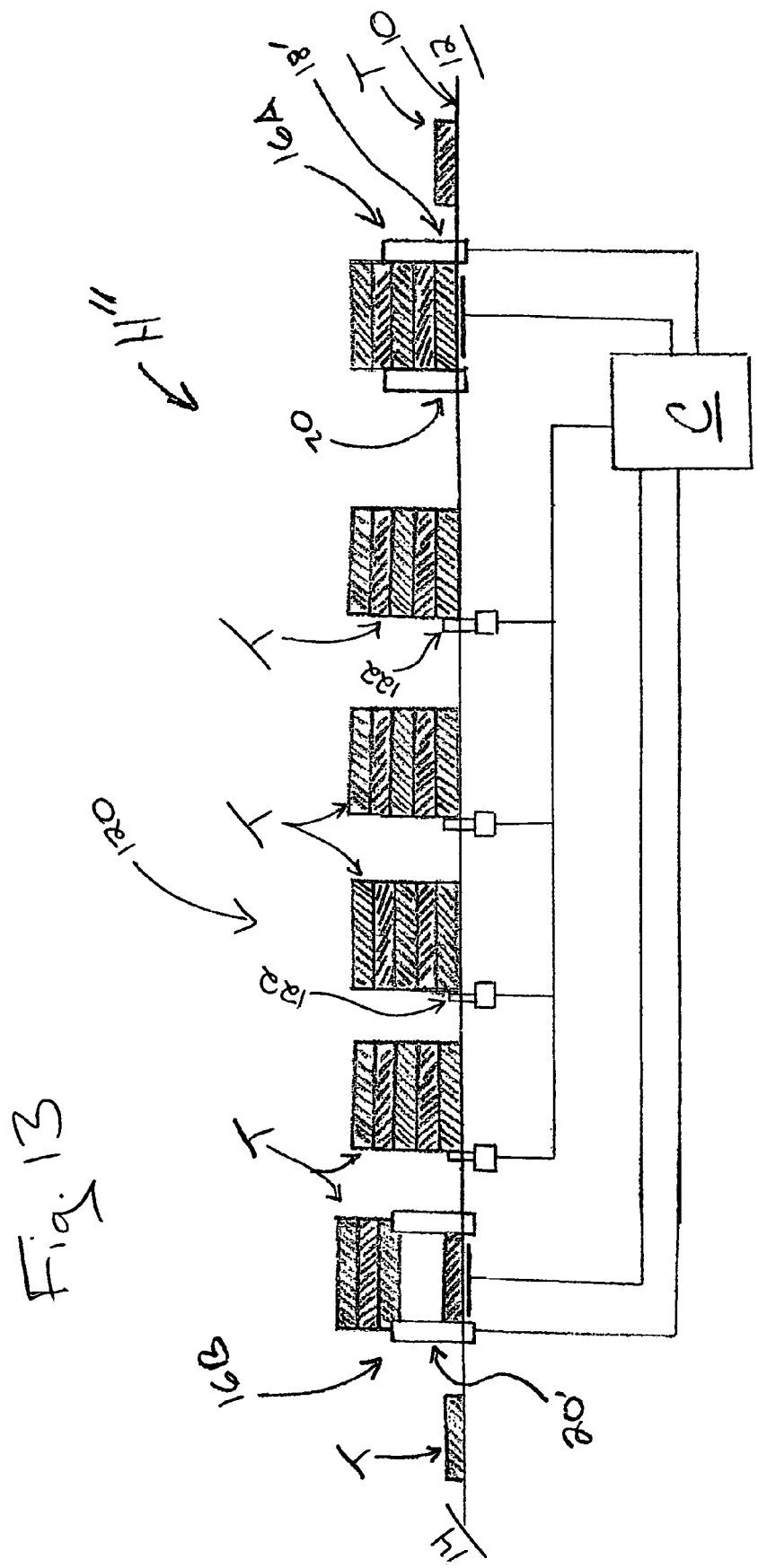
FIG. 13 is a schematic of a tray handler system according to another embodiment.

As best shown in FIG. 13, a tray handler system H" is disclosed which stacks and de-stacks trays T. System H" is similar to system H'. As such, system H" includes stacker 16A and de-stacker 16B. Stacker 16A is configured and controlled for stacking trays T, and de-stacker 16B is configured and controlled for de-stacking trays T, as described above. System H" also includes conveyor 10, which interconnects first location 12 and second location 14, for conveying a plurality of trays T therebetween. System H" may include a processing machine at first location 12 as well as another processing machine at second location 14. For example, an edger, surfacing machine, blocking machine, or coating machine may be provided at first location 12 and/or second location 14.

System H" also includes an indexing station 120 intermediate stacker 16A and de-stacker 16B. Indexing station 120 is an extending length of conveyor 10, which includes a plurality of tray stops 122. Tray stops 122 are moveable upwardly from a position below conveyor 10 to a position above conveyor 10, so that stacks of tray T contact tray stops 122. Preferably, tray stops 122 are air cylinders disposed just below conveyor 10. Upon actuation, an associated cylinder rod extends upwardly into the path of trays T on conveyor 10, as shown in FIG. 13, stopping movement of the stacks of trays T along conveyor 10. Each tray stop 122 is in communication with controller C. Alternatively, each tray stop 122 may be connected to a support beam, which is actuated by a single air cylinder so that actuation of the single air cylinder causes all tray stops 122 to move upwardly and into the path of trays T on conveyor 10.

Any number of tray stops 122 may be provided in indexing station 120. Tray stops 122 are spaced by a predetermined distance, forming a space between adjacent tray stops 122 in which a stack of trays T is held. Each stack of trays proceeds along conveyor 10, and is temporarily stopped by each tray stop 122. As such, tray stops 122 assure that each stack of trays T will proceed through indexing station 120 in an indexed queue for a predetermined amount of time, even if there is a delay in the stacking or de-stacking process causing a gap between stacks of trays. Such a gap or delay in the process simply results in an empty space between adjacent tray stops 122.

In this way, each tray stop 122 (and therefore stack of trays T) proceeds through indexing station 120 at a predetermined rate. This may allow for the lenses in each tray T to be cooled, heated or dried for a predetermined amount of time between processing machines. For example, location 12 may include a blocking machine, which affixes blocks to each lens. After being blocked, the lenses are maintained in their respective tray T, and proceed to stacker 16A. The trays T containing blocked lenses are stacked, and proceed along conveyor 10. The trays T containing the blocked lenses may then proceed to the de-stacker, and forwarded along to a surfacing machine. Prior to surfacing, however, the adhesive or wax securing the blocks to the lenses should be sufficiently cured. The rate at which each stack of trays T containing blocked lenses passes through indexing station 120 assures that the blocked lenses will be sufficiently cured prior to entering de-stacker 16B and/or surfacer.

Therefore, the length of conveyor 10 in indexing station 120, and the rate at which each stack of trays T passes through indexing station 120, may vary depending on the particular blocking adhesive and processing equipment. It should be understood that the configuration of indexing station 120 may vary depending on the particular processing arrangement. For example, a coating machine may be provided at location 12 which applies a finish to the edged lenses. Indexing station 120 would then be configured such that the length of conveyor 10 and the rate at which the coated lenses pass therethrough assures that the finish coat is sufficiently dried prior to de-stacking and further processing at location 14.

Indexing station 120 may include a refrigerated housing or other cooling mechanism for expediting cooling of the lenses in trays T. Other variations of indexing station 120 may also be provided depending on the processing requirements of the particular system. For example, indexing station 120 may include a drying or heating mechanism. Such modifications would be apparent to one skilled in the art.

The gimbaled clamp design of the tray handler of the present invention allows for a variety of tray designs and configurations to be clamped. In addition, the entire clamping mechanism of the stacker 16 may be actuated, i.e. either opening or closing the clamp assemblies, by movement of actuator plate 62. Because actuator plate 62 is actuated using one air cylinder, the system provides for improved reliability and simplicity of design.

The present invention has been described herein in terms of various preferred embodiments. Various modifications and additions to the embodiments would be apparent to those skilled in the art upon a reading of the foregoing description. It is intended that all such modifications be included within the scope of this invention to the extent that they are encompassed by the claims herein.

We claim:

1. A tray handler for stacking and de-stacking ophthalmic prescription trays, the tray handler comprising:
    a plurality of spaced clamp assemblies defining a stack area along a conveyor, wherein each of said clamp assemblies comprises a bracket and a gripper assembly pivotally connected thereto;
    a lift plate operably disposed within the stack area;
    a first actuator operably associated with said clamp assemblies, said clamp assemblies inwardly and outwardly moveable relative said lift plate upon actuation of said first actuator;
    a second actuator operably associated with said lift plate, said lift plate vertically moveable within the stack area upon actuation of said second actuator;
    an actuator plate disposed beneath said lift plate and coupled to said gripper assemblies, said actuator plate moveable between first and second positions via actuation of said first actuator, wherein said gripper assemblies are pivoted inwardly toward said lift plate when said actuator plate is moved from said first position to said second position, and said gripper assemblies are pivoted outwardly away from said lift plate when said actuator plate is moved from said second position to said first position;
    a controller in communication with said first and second actuators for controlling actuation thereof;
    wherein said gripper assembly includes a support post connected to said bracket and a body with a bore extending therethrough, said support post disposed within said bore;
    wherein said support post includes a fulcrum flange extending from a central portion thereof so that said body is gimbaled thereon; and
    wherein said support post includes first and second elastomeric flanges disposed thereon, said fulcrum flange intermediate said first and second elastomeric flanges.

2. The tray handler of claim 1, wherein at least one of said gripper assemblies is pivotally connected to said bracket via a pivot clamp arm.

3. The tray handler of claim 2, further comprising a pivot rod disposed between and connecting said pivot clamp arm and a first end of said actuator plate.

4. The tray handler of claim 3, wherein said pivot rod is substantially perpendicular to said pivot clamp arm.

5. The tray handler of claim 1, wherein at least one gripper assembly is pivotally connected to said bracket via a lever arm.

6. The tray handler of claim 5, wherein said lever arm includes a first end connected to said at least one gripper assembly and an opposite second end, said lever arm being pivotally connected to said bracket at a central point intermediate said first and second ends.

7. The tray handler of claim 6, wherein said lever arm second end is engagable with said actuator plate, said lever arm second end pushed outwardly and away from said actuator plate when said actuator plate is moved from said first position to said second position thereby pivoting said gripper assembly inwardly toward said lift plate, and said lever arm second end retracting inwardly and toward said actuator plate when said actuator plate is moved from said second position to said first position thereby pivoting said gripper assembly outwardly away from said lift plate.

8. The tray handler of claim 7, wherein said tray handler includes at least two gripper assemblies pivotally connected to corresponding brackets via lever arms, each of said lever arms including a cylindrical cam follower connected to a corresponding lever arm second end.

9. The tray handler of claim 8, wherein said actuator plate includes first and second cams secured thereto and aligned with a corresponding one of said cam followers, said cam followers pushed outwardly and away from said actuator plate when said actuator plate is moved from said first position to said second position, and said cam followers retracting inwardly and toward said actuator plate when said actuator plate is moved from said second position to said first position.

10. The tray handler of claim 9, wherein each of said cams has an angled end extending outwardly from opposite sides of said actuator plate by a predetermined distance, said angled ends engaging a corresponding one of said cam followers.

11. The tray handler system of claim 10, wherein said cams are slideably secured to said actuator plate for adjusting said predetermined distance.

12. The tray handler of claim 1, further comprising at least one air nozzle proximate the stack area, said air nozzle connected to a source of a high pressure air for expelling an air stream into the stack area in a desired direction.

13. The tray handler of claim 12, further comprising a support beam disposed between first and second clamp assemblies, said first and second clamp assemblies disposed along a first side of the conveyor, said at least one air nozzle pivotally connected to said support beam.

14. The tray handler of claim 1, further comprising at least one paper guide extending outwardly from and connected to a corresponding one of said brackets, said paper guide including a major planar portion extending outwardly from and angular disposed to one side of the conveyor.

15. The tray handler of claim 1, further comprising a sensor proximate the stack area and in communication with said controller, said sensor for detecting a tray in the stack area, said controller causing actuation of said second actuator when the tray is detected by said sensor.

16. The tray handler of claim 15, wherein said sensor is selected from the group consisting of a photoelectric sensors, inductive position sensors and optical sensors.

17. The tray handler of claim 1, further comprising a conveyor having first and second spaced parallel belts, said lift plate disposed between said first and second belts, said conveyor for conveying a plurality of trays.

18. The tray handler of claim 17, further comprising a sensor in communication with said controller, said sensor for detecting a tray in said stack area, said controller causing said conveyor to stop when the tray is detected by said sensor.

19. The tray handler of claim 17, wherein said lift plate is moveable in a direction substantially perpendicular to said first and second belts.

20. The tray handler of claim 17, further comprising a tray stop proximate the stack area and in communication with said controller, said tray stop upwardly moveable for preventing trays from entering the stack area.

21. The tray handler of claim 17, including first and second spaced tray handlers disposed along said conveyor, each of said first and second tray handlers having said clamp assemblies, said lift plate, and said first and second actuators, said first and second spaced tray handlers in communication with said controller, said first tray handler for stacking trays and said second tray handler for de-stacking trays.

22. The tray handler of claim 21, wherein said first tray handler includes an entry end into which trays are conveyed by said conveyor from a first location, and an exit end from which a stack of trays are discharged.

23. The tray handler of claim 22, wherein said second tray handler includes an entry end into which the stack of trays are conveyed by said conveyor from said first tray handler, and an exit end from which de-stacked trays are discharged to a second location.

24. The tray handler of claim 23, further comprising an edger disposed at said second location for receiving the de-stacked trays.

25. The tray handler of claim 1, wherein said second actuator is a three position air cylinder having an extendable and retractable cylinder head for raising and lowering said lift plate.

26. The tray handler of claim 25, wherein said lift plate is unsecured to said cylinder head so that said lift plate is lowered by gravity as said cylinder head is retracted.

* * * * *